United States Patent
Adeyshvili et al.

(10) Patent No.: US 10,890,803 B2
(45) Date of Patent: Jan. 12, 2021

(54) HEAD-UP DISPLAY

(71) Applicants: DENSO International America, Inc., Southfield, MI (US); DENSO CORPORATION, Kariya (JP)

(72) Inventors: Olga Adeyshvili, Novi, MI (US); Kelly Farner, West Bloomfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/834,415

(22) Filed: Mar. 30, 2020

(65) Prior Publication Data

US 2020/0249531 A1 Aug. 6, 2020

Related U.S. Application Data

(63) Continuation-in-part of application No. 16/123,754, filed on Sep. 6, 2018, now Pat. No. 10,705,336.

(60) Provisional application No. 62/634,417, filed on Feb. 23, 2018.

(51) Int. Cl.
*G02F 1/00* (2006.01)
*G02F 1/13357* (2006.01)

(52) U.S. Cl.
CPC .. *G02F 1/133611* (2013.01); *G02F 1/133603* (2013.01); *G02F 1/133606* (2013.01); *G02F 2001/133607* (2013.01)

(58) Field of Classification Search
CPC ......... G02F 1/133611; G02F 1/133603; G02F 1/133606; G02F 2001/133607; G02B 3/005; G02B 3/0037; F21V 5/007; F21V 5/04; F21V 13/04; F21V 13/12
See application file for complete search history.

(56) References Cited

U.S. PATENT DOCUMENTS

| | | | |
|---|---|---|---|
| 8,591,074 B1 | 11/2013 | Jiang et al. | |
| 2003/0202241 A1 | 10/2003 | Blumel | |
| 2004/0223330 A1 | 11/2004 | Broude et al. | |
| 2007/0070616 A1* | 3/2007 | Segawa | G02F 1/133606 362/296.01 |
| 2008/0043466 A1 | 2/2008 | Chakmakjian et al. | |
| 2008/0232132 A1* | 9/2008 | Graf | G02F 1/133606 362/608 |
| 2008/0304164 A1 | 12/2008 | Chao et al. | |

(Continued)

FOREIGN PATENT DOCUMENTS

| | | |
|---|---|---|
| CN | 203586085 U | 5/2014 |
| JP | 2005338680 A | 12/2005 |

(Continued)

*Primary Examiner* — Y M. Quach Lee
(74) *Attorney, Agent, or Firm* — Harness, Dickey & Pierce, P.L.C.

(57) ABSTRACT

A head-up display including a display element illuminated by a plurality of light emitting elements. A lenslet is between a TIR lens array and the display element. The lenslet includes a first side facing the display element and a second side facing the TIR lens array. At least one of the first side and the second side includes a plurality of horizontal lenses or a plurality of vertical lenses configured to evenly distribute light from the TIR lens array across an eyebox generated by the head-up display and balance luminous uniformity and luminous intensity across the eyebox.

20 Claims, 8 Drawing Sheets

(56) References Cited

U.S. PATENT DOCUMENTS

| | | | |
|---|---|---|---|
| 2009/0237916 A1* | 9/2009 | Park | G02F 1/133603 |
| | | | 362/97.1 |
| 2013/0223081 A1 | 8/2013 | Jiang et al. | |
| 2015/0049463 A1 | 2/2015 | Wang He et al. | |
| 2016/0139408 A1 | 5/2016 | Yagi | |
| 2016/0334075 A1 | 11/2016 | Nambara | |
| 2017/0299922 A1 | 10/2017 | Matsuura et al. | |
| 2017/0329133 A1 | 11/2017 | Nambara | |
| 2017/0329181 A1 | 11/2017 | Pierre | |
| 2019/0171010 A1 | 6/2019 | Nambara | |

FOREIGN PATENT DOCUMENTS

| | | |
|---|---|---|
| JP | 2013115079 A | 6/2013 |
| JP | 2014067023 A | 4/2014 |
| JP | 2015232943 A | 12/2015 |
| JP | 2018005007 A | 1/2018 |
| WO | 2018030023 A1 | 2/2018 |

* cited by examiner

HEAD-UP DISPLAY

CROSS-REFERENCE TO RELATED APPLICATIONS

This application is a continuation-in-part of U.S. patent application Ser. No. 16/123,754 filed on Sep. 6, 2018, which claims the benefit of U.S. Provisional Application No. 62/634,417 filed on Feb. 23, 2018. The entire disclosures of the above applications are incorporated herein by reference.

FIELD

The present disclosure relates to a head-up display, such as for a vehicle.

BACKGROUND

This section provides background information related to the present disclosure, which is not necessarily prior art.

Typical backlighting designs for vehicle head-up displays often include two or three optical elements, such as a first element to collect light from LEDs, a second element to collimate the light beam, and a third element to diffuse and/or redistribute energy from the center to the left and right eyebox position. While current head-up display backlighting designs are suitable for their intended use, they are subject to improvement. For example, current designs are unable to provide a desired luminance uniformity on the eyebox. The present disclosure advantageously provides for a head-up display assembly that maximizes luminance intensity on the eyebox, and fulfills industry requirements for luminance uniformity, as well as flexibility to adjust luminance intensity to the right and left eyebox position, all with only a single optical element. The present disclosure provides for numerous additional advantages as explained in detail herein, and as one skilled in the art will appreciate.

SUMMARY

This section provides a general summary of the disclosure, and is not a comprehensive disclosure of its full scope or all of its features.

The present disclosure provides for a head-up display including a display element illuminated by a plurality of light emitting elements. A lenslet is between a TIR lens array and the display element. The lenslet includes a first side facing the display element and a second side facing the TIR lens array. At least one of the first side and the second side includes a plurality of horizontal lenses or a plurality of vertical lenses configured to evenly distribute light from the TIR lens array across an eyebox generated by the head-up display and balance luminous uniformity and luminous intensity across the eyebox.

The present disclosure further provides for a head-up display including a display element illuminated by a plurality of light emitting elements. A lenslet is between a TIR lens array and the display element. The lenslet includes a first side facing the display element and a second side facing the TIR lens array. Formed on at least one of the first side and the second side are a plurality of horizontal lenses or a plurality of vertical lenses configured to evenly distribute light from the TIR lens array across an eyebox generated by the head-up display and balance luminous uniformity and luminous intensity across the eyebox.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
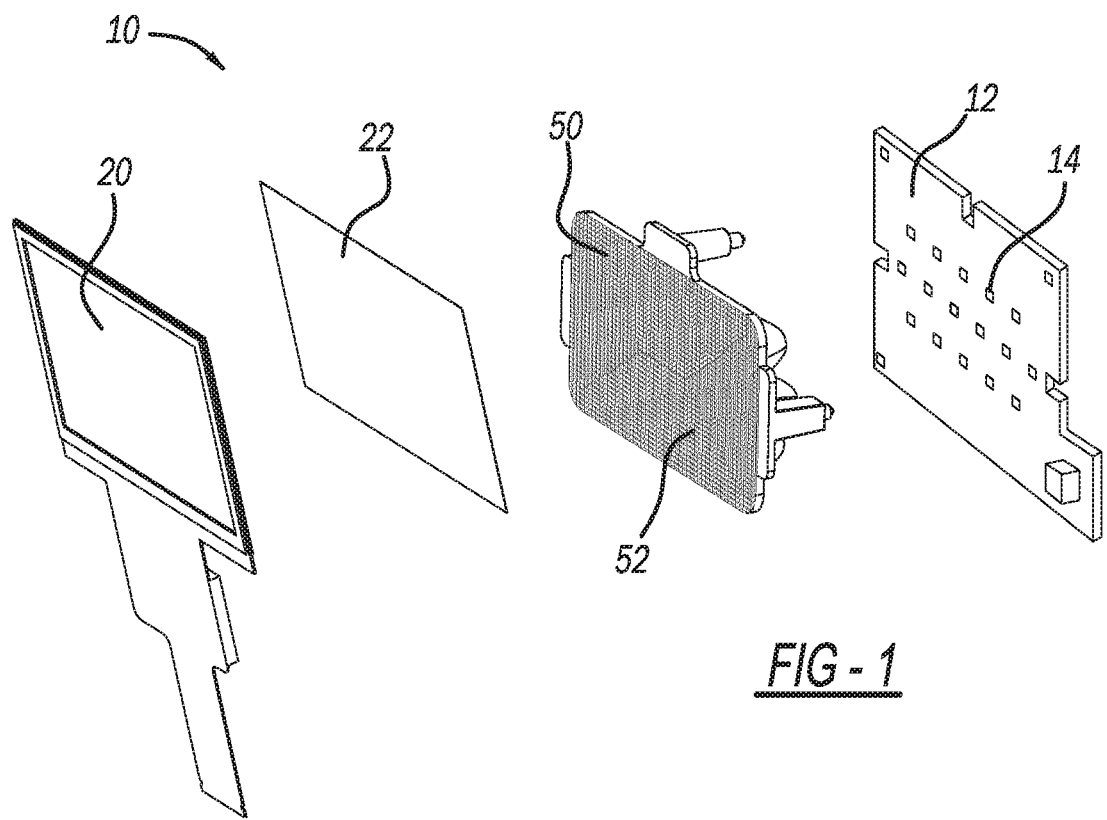
FIG. 1 is an exploded view of a head-up display assembly in accordance with the present disclosure.

With initial reference to FIG. 1, a head-up display (HUD) assembly in accordance with the present disclosure is generally illustrated at reference numeral 10. The HUD assembly 10 includes a printed circuit board (PCB) 12 having a plurality of light emitting elements. Any suitable light emitting elements can be included, such as light emitting diodes (LED) 14. The LEDs 14 illuminate a display element 20. The display element 20 may be any suitable display, such as a liquid-crystal display. Any suitable liquid-crystal display may be included, such as a thin-film-transistor liquid-crystal display. Light from the LEDs 14 is directed to the display element 20 by a total internal reflection (TIR) lens array 50 in accordance with the present disclosure. Any suitable light diffuser 22 may be arranged between the TIR lens array 50 and the display element 20.

The HUD assembly 10 may be configured for use with any suitable vehicular or non-vehicular application to convey information to a user. With respect to vehicular applications, the HUD assembly 10 may be configured to display information in a driver's line of sight to enhance safe operation of the vehicle. Any suitable information may be displayed by the HUD assembly 10, such as, but not limited to, the following: current vehicle speed; road speed limit; engine speed limit; navigational commands; vehicle heading; and entertainment system information (e.g., current radio station, selected podcast, etc.). The head-up display assembly 10 may also be adapted for use in any suitable non-vehicular application, such as aircraft applications, watercraft applications, military applications, etc.

Figure 2:
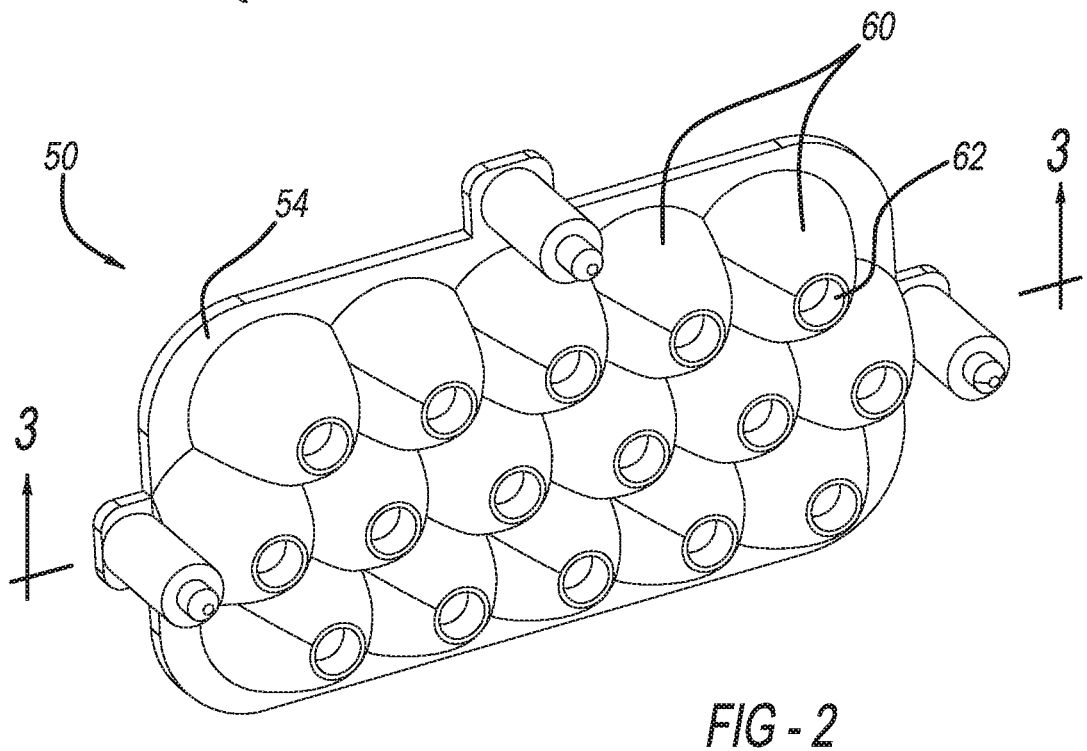
FIG. 2 is a perspective view of a lens array of the head-up display assembly of FIG. 1.
Figure 3:
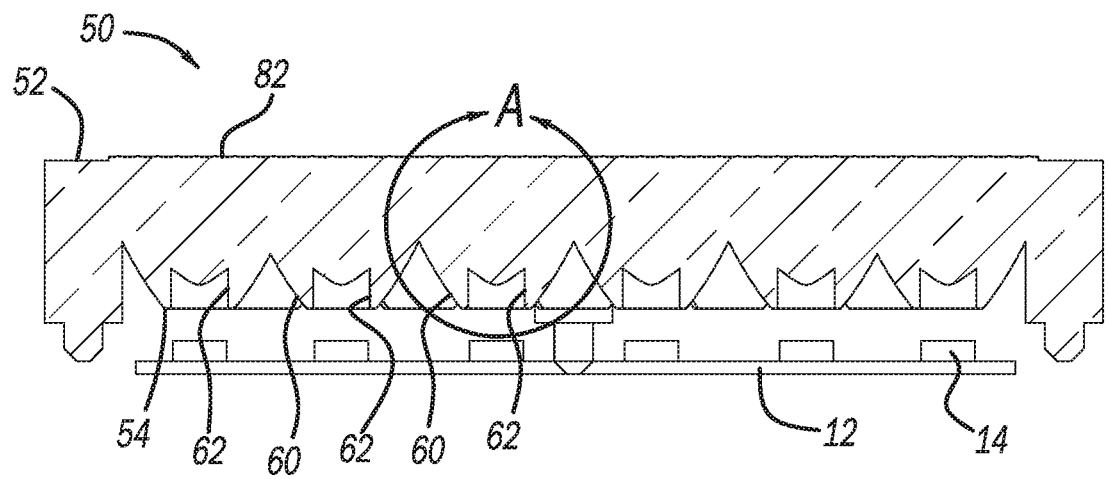
FIG. 3 is a cross-sectional view taken along line 3-3 of FIG. 2.

With continued reference to FIG. 1, and additional reference to FIGS. 2-4, the TIR lens array 50 will now be described in additional detail. The TIR lens array 50 has a front side 52 (see FIGS. 1 and 3, for example) and a rear side 54 (see FIGS. 2 and 3). The TIR lens array 50 includes a plurality of TIR lenses 60. Any suitable number of TIR lenses 60 may be included, such as one TIR lens 60 for each LED 14. The TIR lenses 60 may be arranged in any suitable manner. For example, the TIR lenses 60 may be arranged in plurality of different rows, such as three rows as illustrated in FIG. 2. The TIR lenses 60 of different rows are staggered such that the TIR lenses 60 in adjacent rows are not aligned with one another. Thus, TIR lenses 60 of a particular row are arranged in the middle (or about the middle) of two TIR lenses 60 in a higher row and two TIR lenses 60 in a lower row. In other words, the TIR lenses 60 in the middle row of FIG. 2 are each between two TIR lenses 60 of an adjacent upper row and two TIR lenses 60 of an adjacent a lower row. Each one of the TIR lenses 60 defines a light input aperture 62. The TIR lens array 50 is arranged over the PCB 12 such that each light input aperture 62 is aligned with one of the LEDs 14 (see FIG. 4, which illustrates alignment between a TIR lens 60 and an LED 14).

Figure 4:
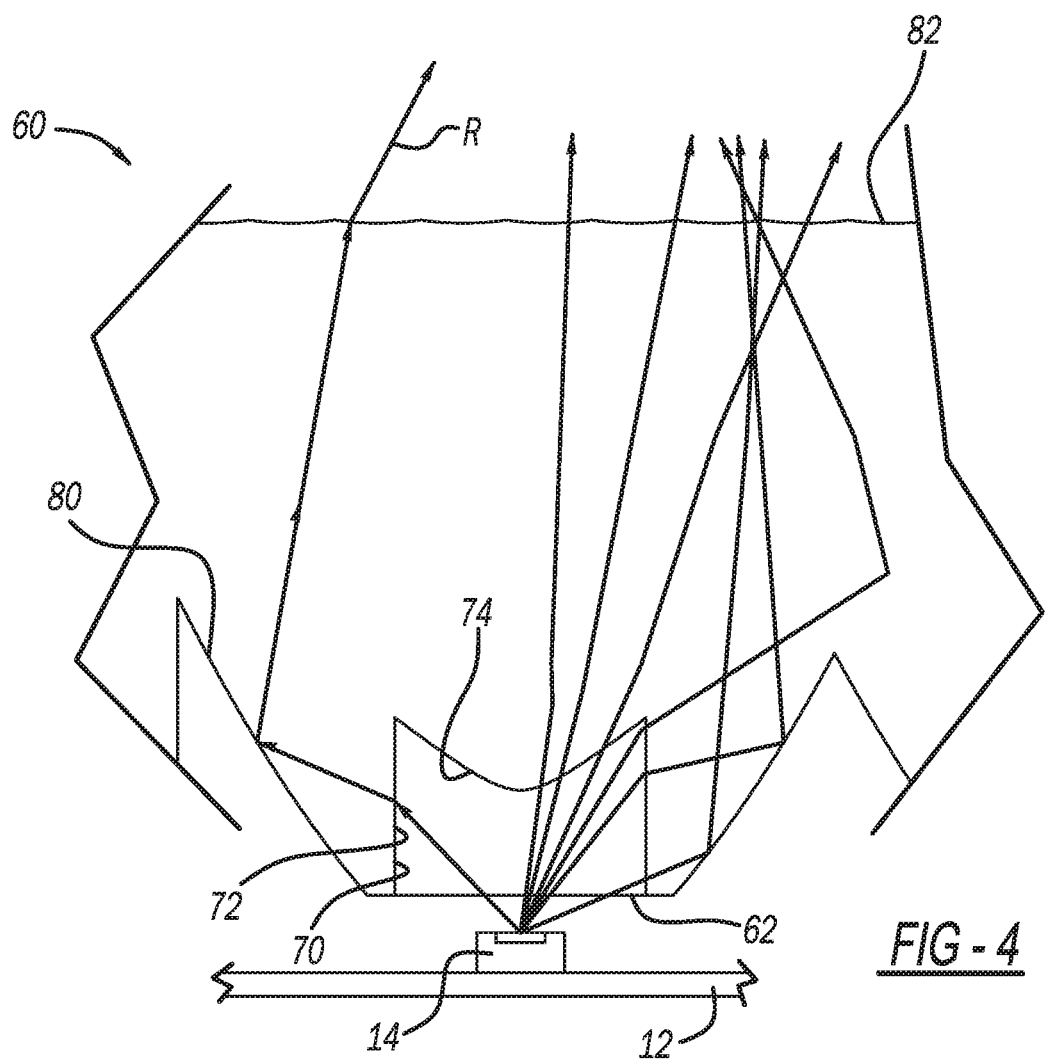
FIG. 4 is close-up view of area A of FIG. 3.

With reference to FIG. 4, for example, each TIR lens 60 has a first light transmission plane 70 at the light input aperture 62. The first light transmission plane 70 includes sidewalls 72 and a curved surface (or curved lens) 74, which is convex relative to the direction of the PCB 12. Surrounding the sidewalls 72 is a refractive plane 80. The refractive plane 80 extends about the sidewalls 72 to provide the TIR lens 60 as a teacup form lens.

Opposite to the light input aperture 62 is a second light transmission plane at the front side 52, which can be a lenslet 82, such as a negative lenslet or a positive lenslet, for example, depending on the application and function. The lenslet 82 may include any suitable material extending across the front side 52 of the TIR lens array 50. The lenslet 82 may include any suitable grooves, textures, and/or concave/convex surfaces for further removing hotspots and making the light beam passing therethrough more homogenous.

As illustrated in FIG. 4, as light from the LED 14 passes through the sidewall 72 of the first light transmission plane 70, the light reflects off of the refractive plane 80 and is directed to and through the lenslet 82 without scattering. Light from the LED 14 that passes to the curved surface 74 passes through the curved surface 74 and is directed straight out of the TIR lens 60 through the lenslet 82.

Each one of the TIR lens 60 advantageously collects and collimates (focuses, defocuses) light from the LED 14, which allows for a more effective diffuser 22 to be used to achieve luminance uniformity. Because a single TIR lens 60 is able to collect, collimate, and redistribute homogenous light, the present disclosure advantageously provides cost savings over existing head-up display assemblies requiring multiple components to each one of collect, collimate, diffuse and/or redistribute light from the center to the left and right eyebox position. Furthermore, because the TIR lens array 50 maximizes light intensity, the number of LEDs 14 can be reduced as to compared to existing assemblies, thus resulting in energy savings. Furthermore, the TIR lens array 50 has a relatively small thickness as compared to existing assemblies, which advantageously results in a height reduction. The one-piece TIR lens 60 also advantageously requires less time to manufacture as compared to exiting assemblies.

Figure 5:
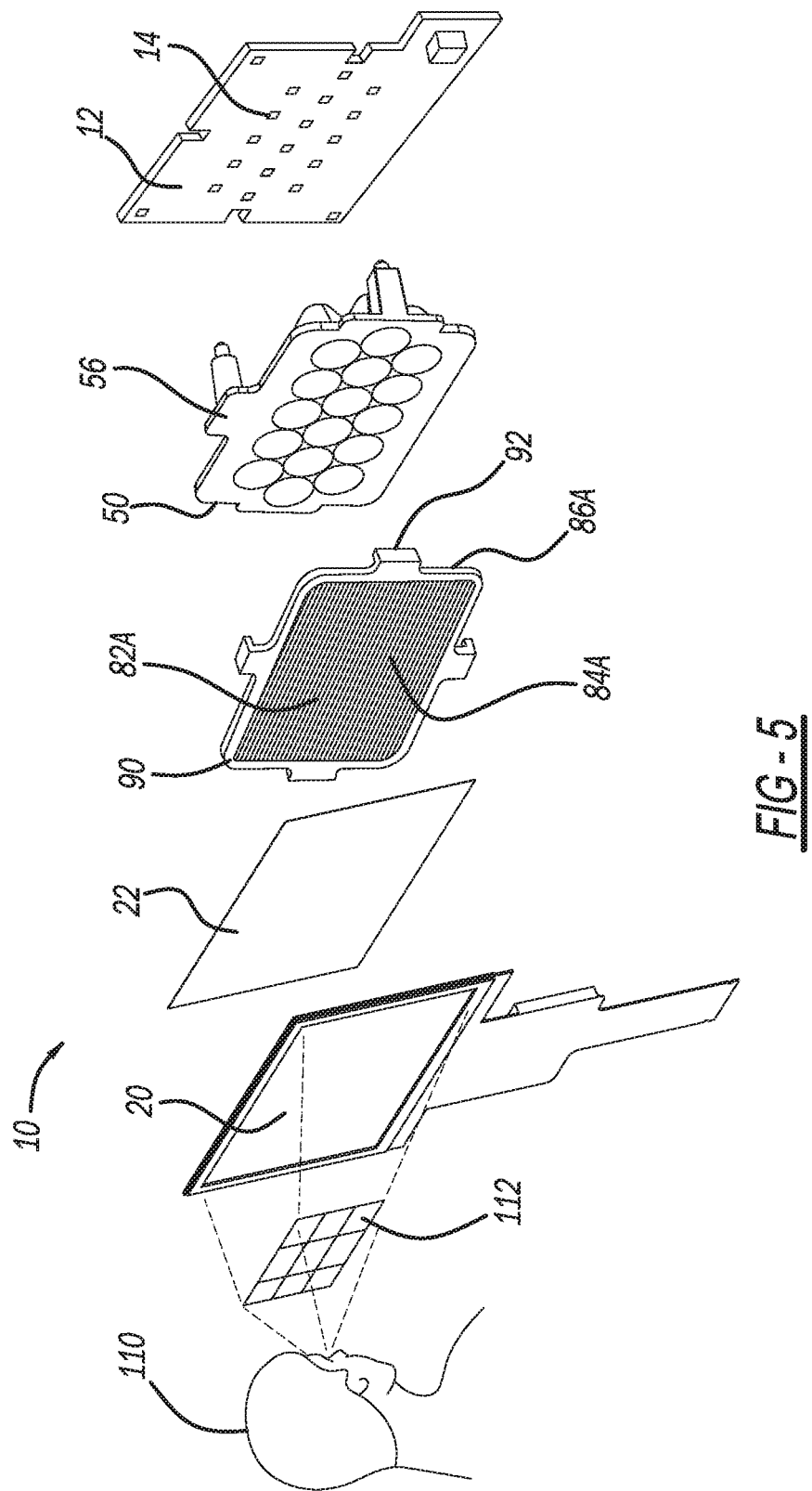
FIG. 5 is an exploded view of another head-up display assembly in accordance with the present disclosure.

FIGS. 5-9B illustrate a plurality of exemplary configurations of the lenslet 82 in accordance with the present disclosure at 82A-82D. As illustrated in FIG. 5, the lenslet 82A is arranged between the TIR lens array 50 and the light diffuser 22. Although FIG. 5 illustrates the lenslet 82A, the HUD assembly 10 may include any one of the other lenslets 82B, 82C, or 82D described herein in place of the lenslet 82A. The lenslet 82A includes a first side 84A and a second side 86A, which is opposite to the first side 84A. The first side 84A faces the light diffuser 22 and the display element 20. Thus, the first side 84A may also be referred to as a display-facing side. The second side 86A faces the TIR lens array 50 and the PCB 12, which includes the LEDs 14. Thus, the second side 86A may be referred to as an LED-facing side.

The lenslet 82A may be integral with the TIR lens array 50. Alternatively, the lenslet 82A may be coupled to the TIR lens array 50 in any suitable manner. For example, the lenslet 82A may include a frame 90 having one or more fasteners 92. The fasteners 92 may be any fasteners suitable for coupling the lenslet 82A to the TIR lens array 50. For example and as illustrated in FIG. 5, the fastener 92 is a clip, which clips onto a tab 56 of the TIR lens array 50. Any suitable number of fasteners 92 and tabs 56 may be included, such as four as illustrated in FIG. 5.

Figure 6A:
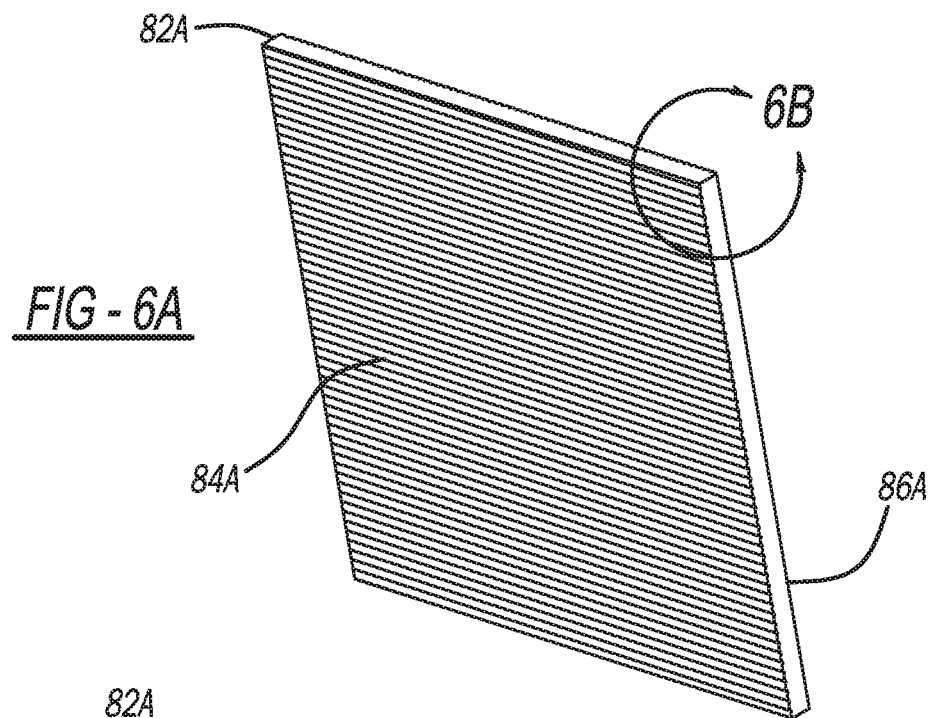
FIG. 6A is a perspective view of a lenslet for the head-up display of FIG. 5 in accordance with the present disclosure.
Figure 6B:
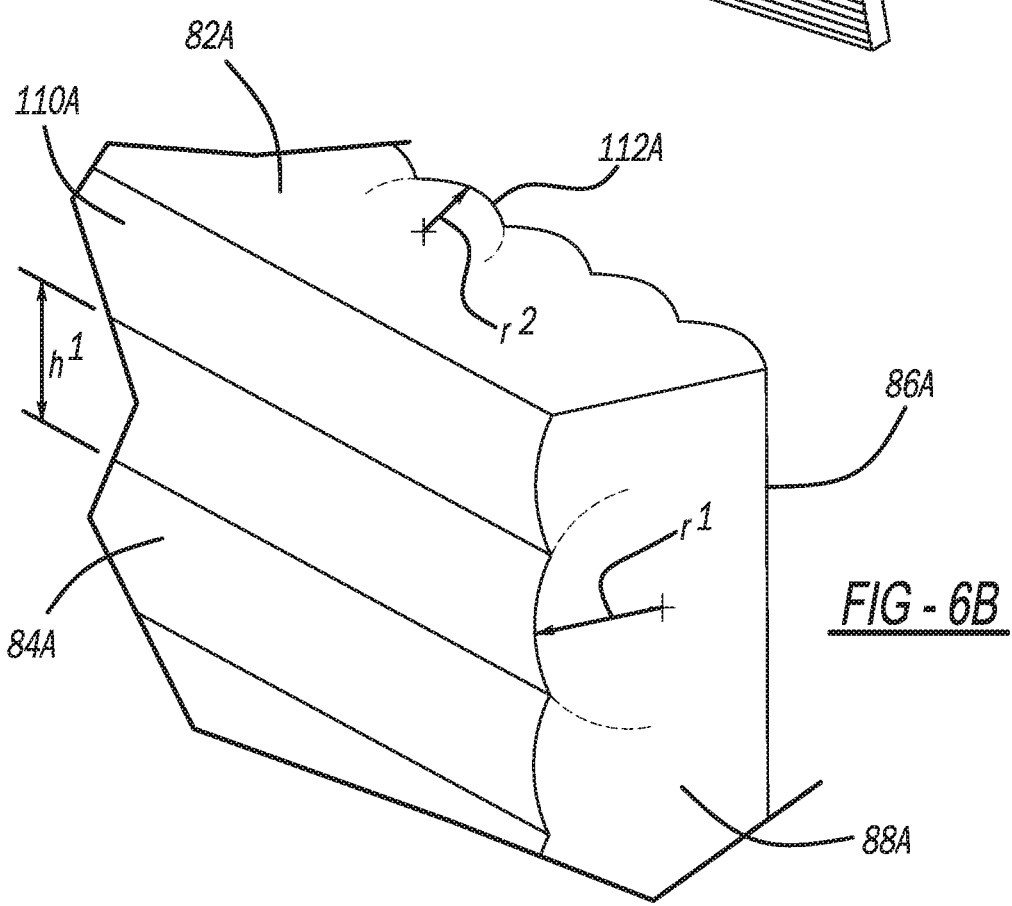
FIG. 6B illustrates area 6B of FIG. 6A.

With reference to FIGS. 6A and 6B, the lenslet 82A includes a body 88A, which may be made of any suitable transparent material, such as any suitable transparent polymeric material. The first side 84A and the second side 86A are opposite sides of the body 88A. At the first side 84A of the body 88A are a plurality of horizontal convex lenses 110A, which may be formed in the first side 84A. Each one of the horizontal convex lenses 110A may have any suitable radius $r^1$. Each one of the horizontal convex lenses 110A may also have any suitable radial height $h^1$. The second side 86A includes a plurality of vertical convex lenses 112A, which may be formed in the second side 86A. Each one of the vertical convex lenses 112A may have any suitable radius $r^2$. The lenses 110A and 112A may be concave, convex, spherical, aspherical, or cylindrical.

The radii $r^1$, $r^2$ and height $h^1$ may have any dimensions suitable to provide an optimal balance between luminous uniformity and luminous intensity at an eyebox 112 generated by the HUD assembly 10 and projected to eyes of a viewer 110 of the HUD assembly 10 (FIG. 5). For example, varying the radius $r^1$ of the horizontal convex lenses 110A controls distribution of light in the vertical direction at the display element 20 and the eyebox 112. Thus, the smaller the radii $r^1$ of the horizontal convex lenses 110A, the greater the light divergence between the top and bottom of the display element 20 and the eyebox 112. Luminance uniformity across the display element 20 and the eyebox 112 is controlled by varying the height $h^1$. The smaller the radial height $h^1$, the finer the features displayed on the display element 20 and the eyebox 112. Varying the radial height $h^1$ also controls pitch. Divergence of light in the left to right direction at the display element 20 and the eyebox 112 is controlled by varying the radius $r^2$ of the vertical convex lenses 112A. Thus, the smaller the radii $r^2$, the greater the divergence of light in the left to right direction at the display element 20 and the eyebox 112.

Figure 7A:
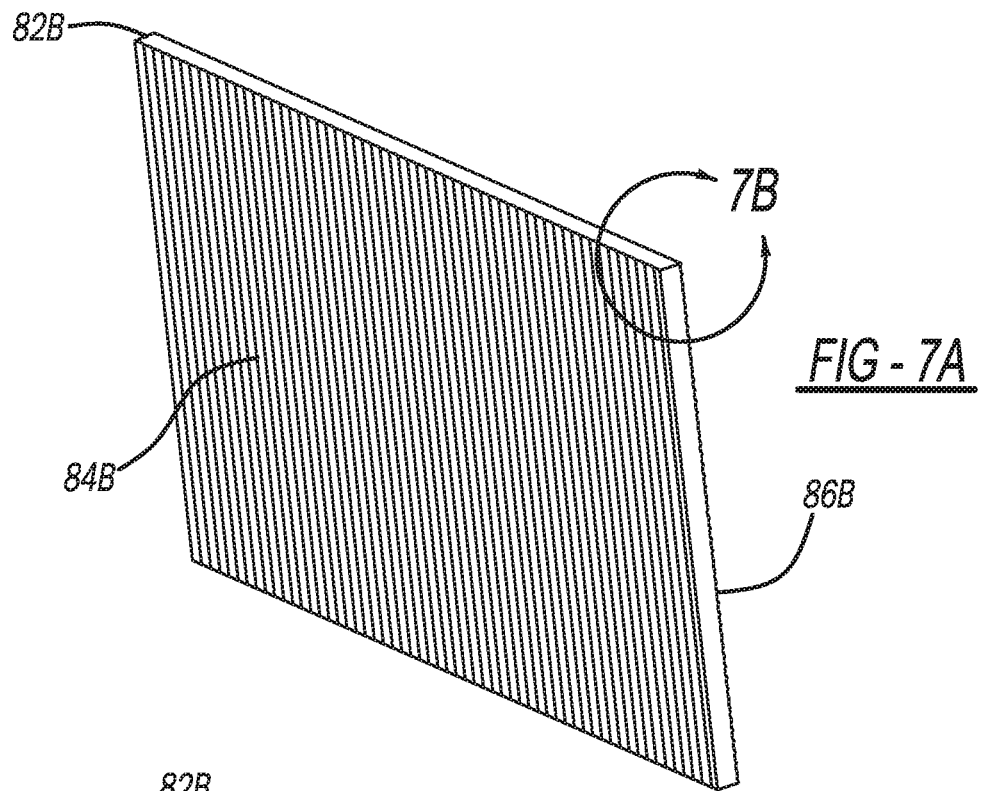
FIG. 7A is a perspective view of another lenslet for the head-up display of FIG. 5 in accordance with the present disclosure.
Figure 7B:
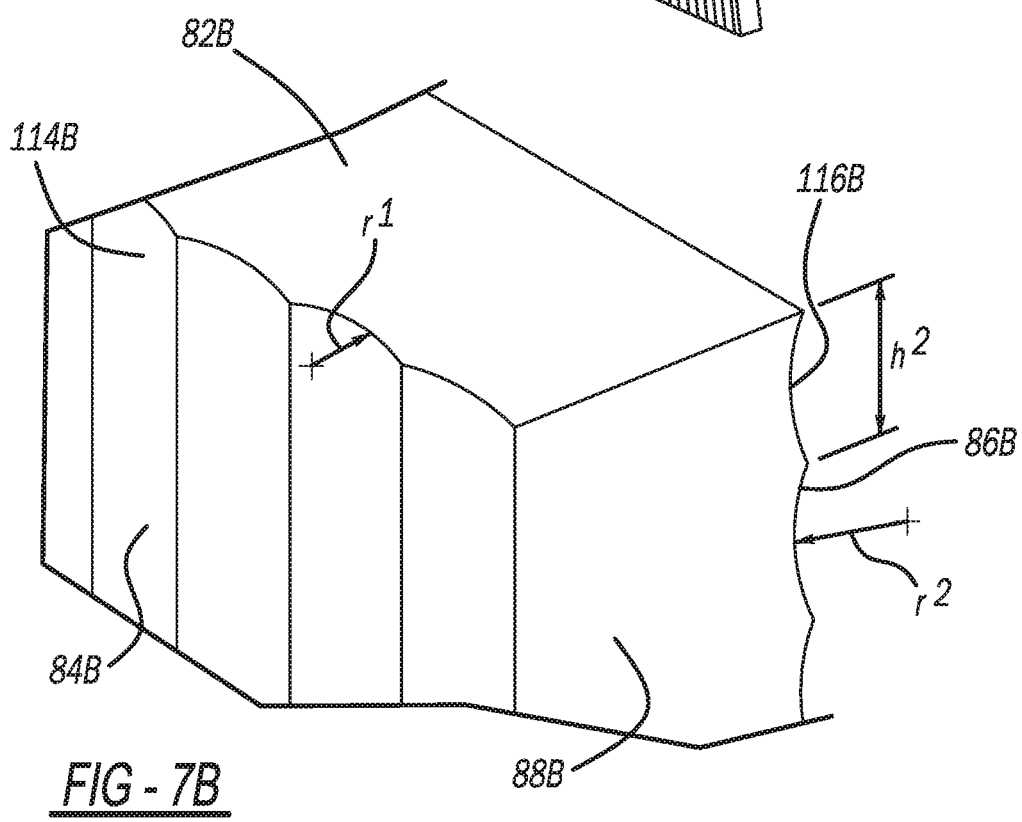
FIG. 7B illustrates area 7B of FIG. 7A.

FIGS. 7A and 7B illustrate another exemplary lenslet 82B in accordance with the present disclosure. The lenslet 82B is similar to the lenslet 82A and thus the similar features are identified in the drawings using the same reference numerals, but with the suffix "B". The description of the similar features set forth above in the description of the lenslet 82A also applies to the lenslet 82B. At the first side 84B of the lenslet 82B are a plurality of vertical concave lenses 114B. Each one of the vertical concave lenses 114B has a radius $r^1$. At the second side 86B are a plurality of horizontal concave lenses 116B. The horizontal concave lenses 116B each have a radius $r^2$ and a radial $h^2$. Divergence of light in the left to right direction at the display element 20 and the eyebox 112 depends on the size of the radius $r^1$ of the vertical concave lenses 114B. Divergence of light vertically from top to bottom of the display element 20 and the eyebox 112 depends on the radius $r^2$ and radial height $h^2$ of the horizontal concave lenses 116B.

Figure 8A:
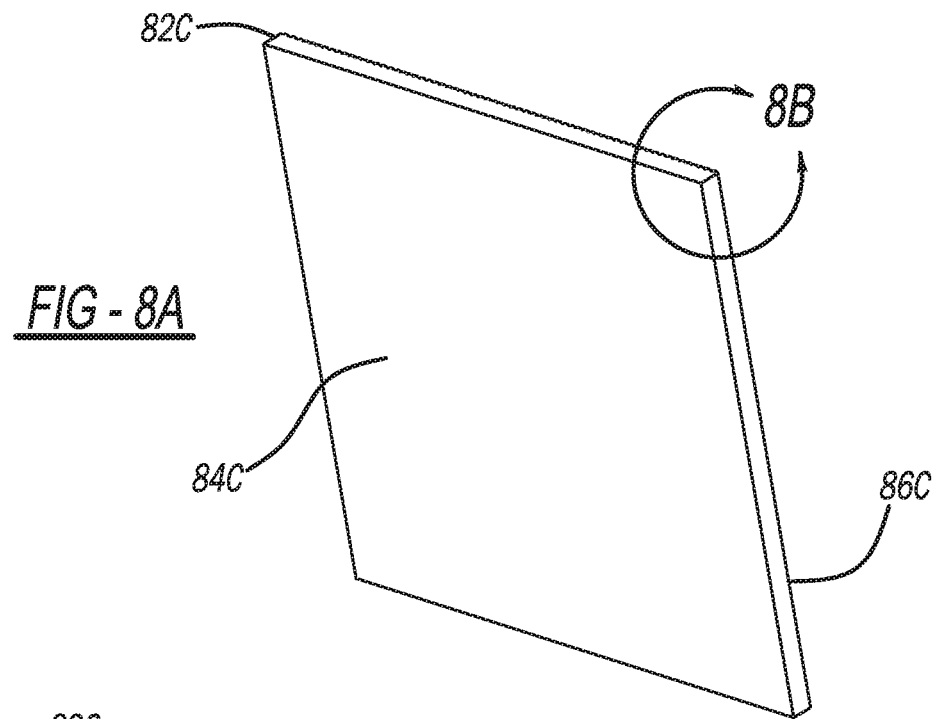
FIG. 8A is a perspective view of an additional lenslet for the head-up display of FIG. 5 in accordance with the present disclosure.
Figure 8B:
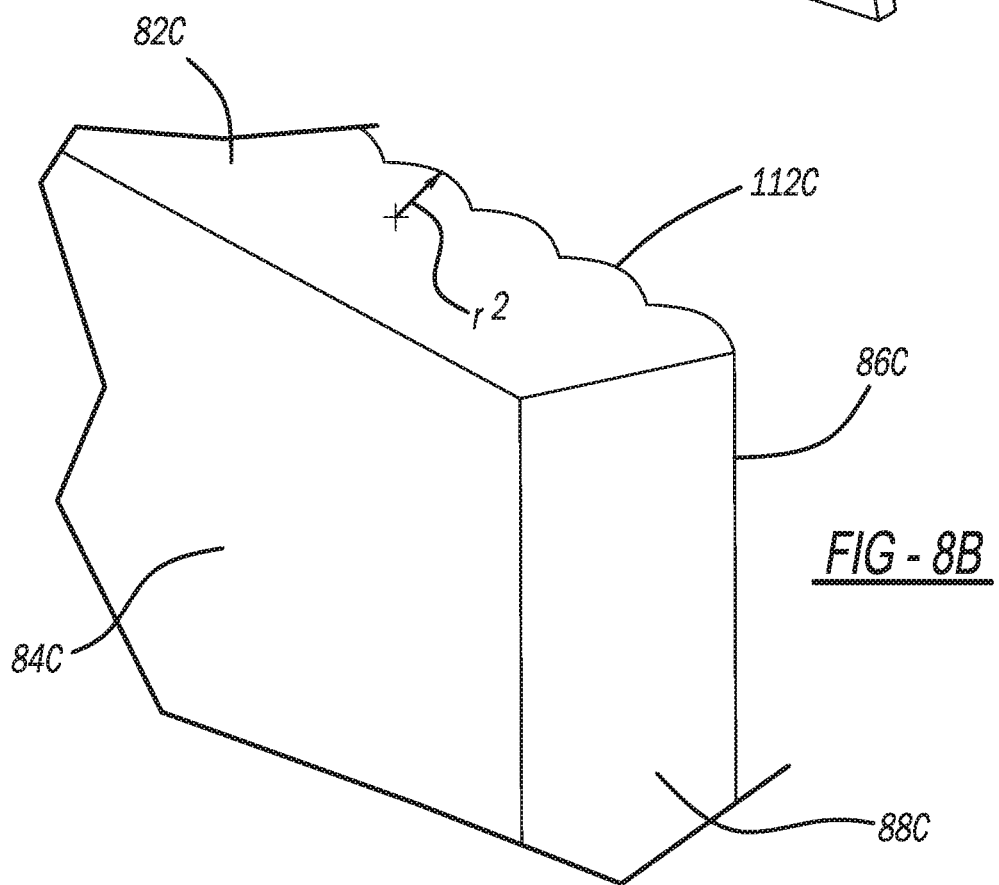
FIG. 8B illustrates area 8B of FIG. 8A.
Figure 8C:
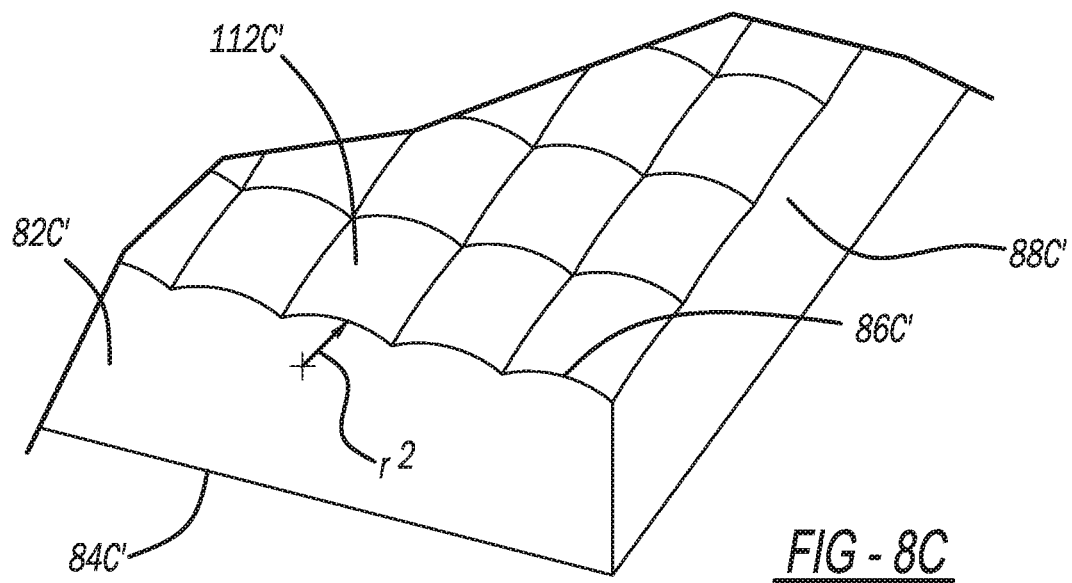
FIG. 8C illustrates the lenslet of FIG. 8A configured as a segmented lenslet.

FIGS. 8A and 8B illustrate another lenslet 82C in accordance with the present disclosure. The lenslet 82C is similar to the lenslet 82A, and thus the similar features are identified in the drawings using the same reference numerals, but with the suffix "C". The description of the similar features set forth above in the description of the lenslet 82A also applies to the lenslet 82C. At the first side 84C, the lenslet 82C is without lenses. Thus, the first side 84C may be planar. The second side 86C includes the vertical convex lenses 112C. The vertical convex lenses 112C each include the radius $r^2$. Thus, as described above in the description of the lenslet 82A, varying the radius $r^2$ will vary light divergence in the left to right direction at the display element 20 and the eyebox 112. As illustrated in FIG. 8C, the lenslet 82C may be configured as a segmented lenslet 82C' including segmented vertical convex lenses 112C'. Features of the segmented lenslet 82C' that are similar to, or the same as, the lenslet 82C are illustrated in FIG. 8C using the same reference numbers but with the prime (') designation.

Figure 9A:
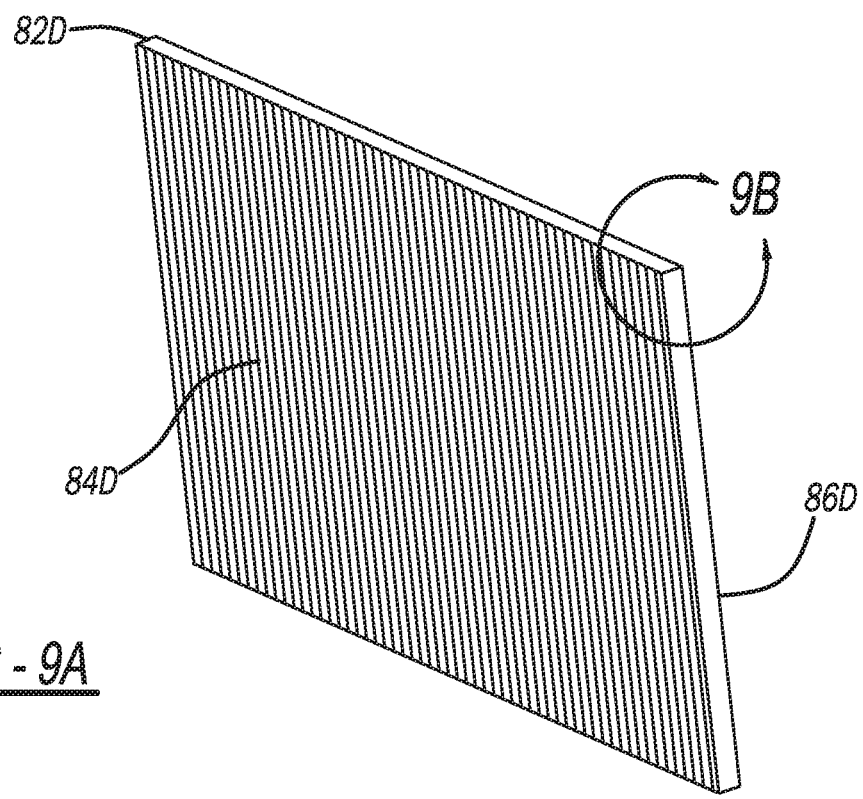
FIG. 9A is a perspective view of yet another lenslet for the head-up display of FIG. 5 in accordance with the present disclosure.
Figure 9B:
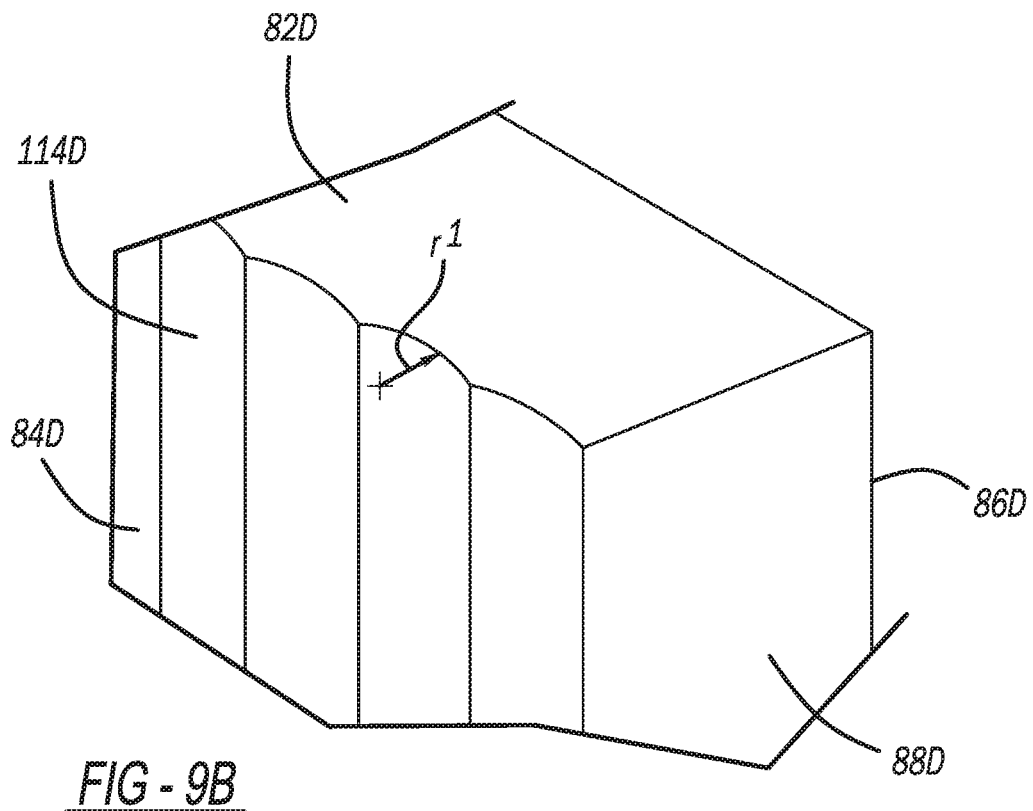
FIG. 9B illustrates area 9B of FIG. 9A.
Figure 9C:
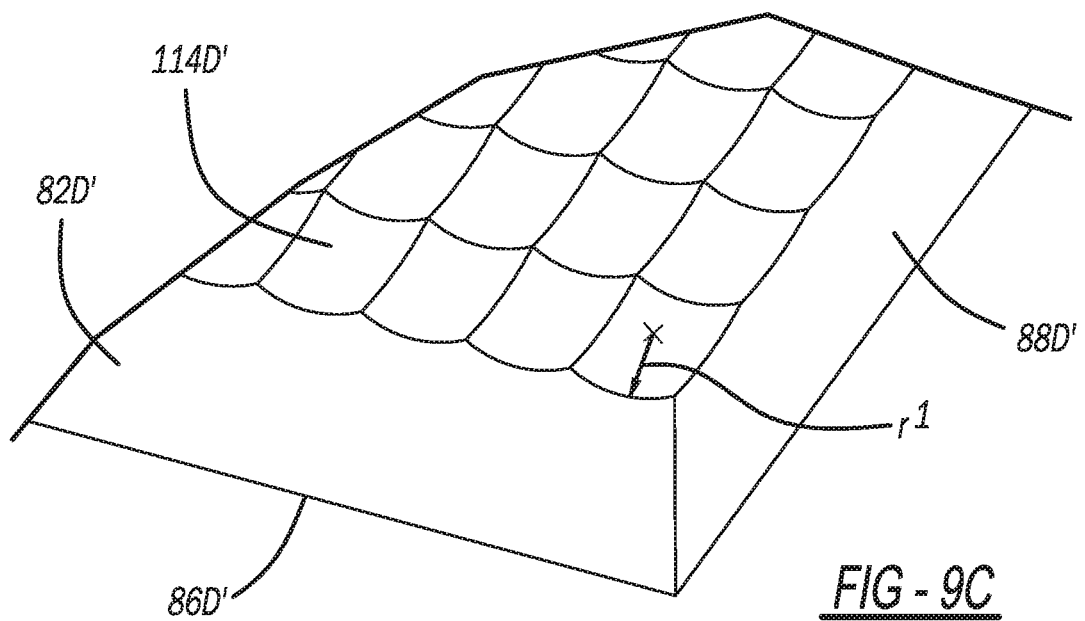
FIG. 9C illustrates the lenslet of FIG. 9A configured as a segmented lenslet.

FIGS. 9A and 9B illustrate an additional lenslet 82D in accordance with the present disclosure. The lenslet 82D is similar to the lenslet 82A, and thus the similar features are identified in the drawings using the same reference numerals, but with the suffix "D." The description of the similar features set forth above in the description of the lenslet 82A also applies to the lenslet 82D. At the first side 84D of the lenslet 82D are a plurality of vertical concave lenses 114D. Each of the vertical concave lenses 114D has the radius $r^1$. Control of light divergence in the left to right direction across the display element 20 and the eyebox 112 is controlled by varying the radius $r^2$. As illustrated in FIG. 9C, the lenslet 82D may be configured as a segmented lenslet 82D' including segmented vertical concave lenses 112C'. Features of the segmented lenslet 82D' that are similar to, or the same as, the lenslet 82D are illustrated in FIG. 9C using the same reference numbers but with the prime (') designation.

The present disclosure thus advantageously provides for the lenslets 82A-82D, which improve luminous uniformity across the display element 20 and the eyebox 112, and make luminous uniformity less sensitive to manufacturing tolerances. As described above, luminous uniformity may be controlled by varying the radii $r^1$, $r^2$ and radial height $h^1$, $h^2$ of the lenses 110A, 112A, 114B, 116B, 112C, and 114D. Thus, the lenslets 82A-82D advantageously provide enhanced control over vertical and horizontal light divergence at the display element 20 and the eyebox 112, which allows for a balance to be reached between luminous uniformity and luminous intensity. As a result, the HUD assembly 10 may be further customized to meet various different specifications.

The HUD assembly 10 advantageously generates eyeboxes 112 of any suitable size, such as 150 mm×50 mm or 160 mm×60 mm, for example. The HUD assembly 10 is configured to generate luminescence across the display element 20 and the eyebox 112 of at least 14,000 cd/m$^2$, and luminescent uniformity of min/max>80% for the eyebox 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A head-up display assembly comprising:
a printed circuit board including a plurality of light emitting elements;
a display element illuminated by the plurality of light emitting elements;
a total internal reflection (TIR) lens array between the printed circuit board and the display element including a plurality of TIR lenses, each one of the plurality of TIR lenses is aligned with a different one of the plurality of light emitting elements to reflect and refract light emitted by the plurality of light emitting elements to the display element to illuminate the display element; and
a lenslet between the TIR lens array and the display element, the lenslet including a first side facing the display element and a second side facing the TIR lens array, at least one of the first side and the second side including a plurality of horizontal lenses or a plurality of vertical lenses configured to evenly distribute light from the TIR lens array across an eyebox generated by the head-up display and balance luminous uniformity and luminous intensity across the eyebox;
wherein distribution of light across the eyebox is controlled by varying at least one of radii of the horizontal lenses, radii of the vertical lenses, and height of the horizontal lenses.

2. The head-up display of claim 1, wherein lenslet includes the plurality of horizontal lenses at the first side and the plurality of vertical lenses at the second side, the plurality of horizontal lenses are convex and the plurality of vertical lenses are convex.

3. The head-up display of claim 1, wherein the lenslet includes the plurality of vertical lenses at the first side and the plurality of horizontal lenses at the second side, the plurality of vertical lenses are concave and the plurality of horizontal lenses are concave.

4. The head-up display of claim 1, wherein the lenslet is without a lens at the first side and the lenslet includes the plurality of vertical lenses at the second side, the plurality of vertical lenses are convex.

5. The head-up display of claim 4, wherein the first side is planar and the plurality of vertical lenses are segmented.

6. The head-up display of claim 1, wherein the lenslet is without a lens at the second side and the lenslet includes the plurality of vertical lenses at the first side, the plurality of vertical lenses are concave and segmented.

7. The head-up display of claim 1, wherein the plurality of horizontal lenses have different radii than the plurality of vertical lenses.

8. The head-up display of claim 1, wherein the lenslet is integral with the TIR lens array.

9. The head-up display of claim 1, wherein the lenslet is configured to be coupled to the TIR lens array with a fastener.

10. The head-up display of claim 1, wherein the TIR lens array includes a plurality of TIR lenses arranged in linearly aligned rows and vertically staggered columns such that TIR lenses in adjacent rows are not aligned vertically with one another, each one of the plurality of TIR lenses including a first light transmission plane at a light input aperture aligned with a different one of the plurality of light emitting elements.

11. The head-up display of claim 10, wherein the lenslet includes a second light transmission plane, the lenslet configured to at least one of collimate, diverge, and converge light emitted by the plurality of light emitting elements.

12. The head-up display of claim 1, wherein the plurality of horizontal lenses and the plurality of vertical lenses are one of spherical, aspherical, and cylindrical.

13. The head-up display of claim 1, wherein the plurality of horizontal lenses and the plurality of vertical lenses are negative lenses.

14. The head-up display of claim 1, wherein the plurality of horizontal lenses and the plurality of vertical lenses are positive lenses.

15. A head-up display assembly comprising:
a printed circuit board including a plurality of light emitting elements;
a display element illuminated by the plurality of light emitting elements;
a total internal reflection (TIR) lens array between the printed circuit board and the display element including a plurality of TIR lenses that reflect and refract light emitted by the plurality of light emitting elements to the display element to illuminate the display element; and
a transparent lenslet between the TIR lens array and the display element through which light from the TIR lens array passes, the lenslet including a first side facing the display element and a second side facing the TIR lens array, formed on at least one of the first side and the second side are a plurality of horizontal lenses or a plurality of vertical lenses configured to evenly distribute light from the TIR lens array across an eyebox generated by the head-up display and balance luminous uniformity and luminous intensity across the eyebox;
wherein distribution of light across the eyebox is controlled by varying at least one of radii of the horizontal lenses, radii of the vertical lenses, and height of the horizontal lenses.

16. The head-up display of claim 15, wherein lenslet includes the plurality of horizontal lenses at the first side and the plurality of vertical lenses at the second side, the plurality of horizontal lenses are convex and the plurality of vertical lenses are convex.

17. The head-up display of claim 15, wherein the lenslet includes the plurality of vertical lenses at the first side and the plurality of horizontal lenses at the second side, the plurality of vertical lenses are concave and the plurality of horizontal lenses are concave.

18. The head-up display of claim 15, wherein the lenslet is without a lens at the first side and the lenslet includes the plurality of vertical lenses at the second side, the plurality of vertical lenses are convex.

19. The head-up display of claim 15, wherein the lenslet is without a lens at the second side and the lenslet includes the plurality of vertical lenses at the first side, the plurality of vertical lenses are concave.

20. A head-up display assembly comprising:
- a printed circuit board including a plurality of light emitting elements;
- a display element illuminated by the plurality of light emitting elements;
- a total internal reflection (TIR) lens array between the printed circuit board and the display element including a plurality of TIR lenses, each one of the plurality of TIR lenses is aligned with a different one of the plurality of light emitting elements to reflect and refract light emitted by the plurality of light emitting elements to the display element to illuminate the display element; and
- a lenslet between the TIR lens array and the display element, the lenslet including a first side facing the display element and a second side facing the TIR lens array, at least one of the first side and the second side including a plurality of horizontal lenses or a plurality of vertical lenses configured to evenly distribute light from the TIR lens array across an eyebox generated by the head-up display and balance luminous uniformity and luminous intensity across the eyebox;

wherein the TIR lens array includes a plurality of TIR lenses arranged in linearly aligned rows and vertically staggered columns such that TIR lenses in adjacent rows are not aligned vertically with one another, each one of the plurality of TIR lenses including a first light transmission plane at a light input aperture aligned with a different one of the plurality of light emitting elements.

* * * * *